United States Patent
Koyama et al.

(10) Patent No.: US 6,638,377 B2
(45) Date of Patent: Oct. 28, 2003

(54) ALUMINUM ALLOY PIPING MATERIAL FOR AUTOMOTIVE PIPING EXCELLING IN CORROSION RESISTANCE AND WORKABILITY

(75) Inventors: Takahiro Koyama, Nagoya (JP); Hirokazu Tanaka, Tajimi (JP); Yoshifusa Shoji, Nagoya (JP)

(73) Assignee: Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 09/954,430

(22) Filed: Sep. 17, 2001

(65) Prior Publication Data

US 2003/0000610 A1 Jan. 2, 2003

(30) Foreign Application Priority Data

May 22, 2001 (JP) ........................................ 2001-152085

(51) Int. Cl.$^7$ ............................................... C22C 21/00
(52) U.S. Cl. ........................ 148/437; 420/548; 420/550
(58) Field of Search ................................. 148/437, 415; 420/548, 551, 550, 553

(56) References Cited

U.S. PATENT DOCUMENTS 5,336,341 A * 8/1994 Maejima et al.
5,554,234 A * 9/1996 Takeuchi et al. ............. 148/551
2002/0071782 A1 * 6/2002 Hasegawa et al. ........... 420/537

OTHER PUBLICATIONS

"ASM Handbook vol. 2 Properties and Selection: Nonferrous Alloys and Special–Purpose Materials", ASM International, 1990, pp 17–21, 56–57.*

* cited by examiner

Primary Examiner—George Wyszomierski
Assistant Examiner—Janelle Combs Morillo
(74) Attorney, Agent, or Firm—Flynn, Thiel, Boutell & Tanis, P.C.

(57) ABSTRACT

An aluminum alloy piping material for automotive piping excelling in corrosion resistance and workability and a method of fabricating the same. The aluminum alloy piping material is made of an aluminum alloy which contains 0.3–1.5% of Mn, 0.01–0.20% of Fe, and 0.01–0.20% of Si, wherein the content of Cu as impurities is limited to 0.05% or less, with the balance being Al and impurities, wherein, among Si compounds, Fe compounds, and Mn compounds present in the alloy's matrix, the number of compounds with a particle diameter (equivalent circle diameter, hereinafter the same) of 0.5 $\mu$m or more is $3\times10^4$ or less per mm$^2$. The aluminum alloy piping material has a tensile strength of 70–130 MPa (temper: O material). An ingot of an aluminum alloy having the composition is hot extruded. The resulting extruded pipe is cold drawn at a working ratio of 30% or more and annealed.

18 Claims, No Drawings

ALUMINUM ALLOY PIPING MATERIAL FOR AUTOMOTIVE PIPING EXCELLING IN CORROSION RESISTANCE AND WORKABILITY

BACKGROUND OF THE INVENTION

1. Field of the Invention

The present invention relates to an aluminum alloy piping material for automotive piping excelling in corrosion resistance and workability, which is used for pipes connecting automotive radiators and heaters or pipes connecting automotive evaporators, condensers, and compressors, and to a method of fabricating the same.

2. Description of Background Art

As a piping material used for passages connecting automotive heaters, evaporators, condensers, or compressors, a single pipe consisting of an Al—Mn alloy such as a JIS 3003 alloy (Japanese Patent Application Laid-open No. 63-24133), and a two-layered or three-layered clad pipe consisting of 3003 alloy as a core material and an Al—Zn alloy sacrificial anode material such as a 7072 alloy clad on either the inner side or outer side of the core material (Japanese Patent Application Laid-open No. 56-127767) have been used. The sacrificial anode material exhibits a sacrificial anode effect on pitting corrosion occurring in the core material in a severe environment or crevice corrosion occurring when connected to a rubber hose.

However, when the Al—Mn alloy single pipe is used under severe corrosive environment, pitting corrosion tends to occur. Occurrence of pitting corrosion can be prevented by using the clad pipe. However, this significantly increases costs. When these piping materials are connected to radiators, heaters, evaporators, condensers, compressors, and the like, the pipe ends of the piping materials are caused to bulge. However, the Al—Mn alloy single pipe exhibits inferior workability, whereby working may become difficult.

SUMMARY OF THE INVENTION

The present invention has been achieved as a result of examination of the relation between the structural properties of an Al—Mn alloy single pipe, such as the alloy components and the compound distribution in the alloy matrix, and properties required for automotive piping materials. Accordingly, an object of the present invention is to provide an aluminum alloy piping material for automotive piping made of an Al—Mn alloy single pipe which excels in corrosion resistance and workability and is produced at a low cost.

(1) In order to achieve the above object, the present invention provides an aluminum alloy piping material for automotive piping excelling in corrosion resistance and workability, comprising an aluminum alloy which comprises 0.3–1.5% of Mn, 0.01–0.20% of Fe, and 0.01–0.20% of Si, wherein the content of Cu as impurities is limited to 0.05% or less, with the balance consisting of Al and impurities, wherein, among Si compounds, Fe compounds, and Mn compounds present in the alloy's matrix, the number of compounds with a particular diameter (equivalent circle diameter, hereinafter the same) of 0.5 µm or more is $3 \times 10^4$ or less per $mm^2$.

(2) In this aluminum alloy piping material for automotive piping excelling in corrosion resistance and workability, the aluminum alloy may further comprise 0.4% or less of Mg.

(3) In the above aluminum alloy piping material for automotive piping excelling in corrosion resistance and workability, the aluminum alloy may further comprise 0.01–0.2% of Zr.

(4) In the above aluminum alloy piping material for automotive piping excelling in corrosion resistance and workability, the aluminum alloy piping material refined into an O material has a tensile strength of 70–130 MPa.

(5) A method of fabricating an aluminum alloy piping material for automotive piping excelling in corrosion resistance and workability, comprising hot extruding an ingot of an aluminum alloy having a composition according to any one the above (1) to (3), cold drawing the resulting extruded pipe at a working ratio of 30% or more, and annealing the cold drawn pipe, wherein the aluminum alloy piping material after being refined into an O material has a tensile strength of 70–130 MPa.

(6) In this method of fabricating an aluminum alloy piping material for automotive piping excelling in corrosion resistance and workability, the cooling rate when casting the ingot is 10° C./second or more.

DETAILED DESCRIPTION OF THE INVENTION AND PREFERRED EMBODIMENTS (1) The effects of alloy components and reasons for the limitations thereof, (2) the effects of compounds in the matrix and reasons for the limitations thereof, and (3) the effects of fabrication steps and reasons for the limitations thereof in the present invention are described below.

(1) Effects of Alloy Components and Reasons for Limitations

Mn increases the strength and improves corrosion resistance (pitting corrosion resistance). The Mn content is preferably 0.3–1.5%. If the Mn content is less than 0.3%, the effect may be insufficient. If the Mn content exceeds 1.5%, a large number of Mn compound particles may be formed, whereby the corrosion resistance may decrease.

Fe decreases the grain size after drawing and annealing. If the grain size is large, surface roughening or cracks tend to occur during bending or bulge formation of the piping material. The Fe content is preferably 0.01–0.20%. If the Fe content is less than 0.01%, the effect may be insufficient. If the Fe content exceeds 0.20%, a large number of Fe compound particles may be formed, whereby the corrosion resistance may decrease. The Fe content is still more preferably 0.01–0.10%.

Si decreases the grain size after drawing and annealing, thereby preventing the occurrence of surface roughening or cracks during bending or bulge formation. Moreover, Si forms Al—Mn—Si compounds and Al—Mn—Fe—Si compounds, thereby preventing the occurrence of penetration between tools and the material during bending or bulge formation. The Si content is preferably 0.01–0.20%. If the Si content is less than 0.01%, the effect maybe insufficient. If the Si content exceeds 0.20%, a large number of Si compound particles may be formed, whereby the corrosion resistance may decrease. The Si content is still more preferably 0.01–0.10%.

Cu dissolves in a corrosive environment and decreases the corrosion resistance by readhering to the surface by reduction. If the Cu content exceeds 0.05%, the corrosion resistance significantly decreases due to readhesion under repeated humidity-salt spray conditions. The Cu content is still more preferably 0.02% or less.

Mg increases the strength of the piping material and decreases the grain size. The Mg content is preferably 0.4% or less. If the Mg content exceeds 0.4%, extrusion capability and corrosion resistance may decrease. The Mg content is still more preferably 0.2% or less.

Zr is separately distributed in a high-concentration area and a low-concentration area along the extrusion direction. These areas are alternately layered in the direction of the thickness. The low-concentration area is preferentially corroded rather than the high-concentration area, thereby forming corrosion layers. This prevents the corrosion from proceeding in the direction of the thickness, thereby improving pitting corrosion resistance and crevice corrosion resistance of the material. The Zr content is preferably 0.01–0.2%. If the Zr content is less than 0.01%, the effect may be insufficient. If the Zr content exceeds 0.2%, giant compounds are produced during casting, whereby a sound piping material cannot be obtained.

(2) Effects of compounds in the alloy's matrix and reasons for limitations

The aluminum alloy piping material of the present invention comprises an aluminum alloy which comprises the above components, wherein, among Si compounds, Fe compounds, and Mn compounds present in the alloy's matrix, the number of compounds with a particle diameter (equivalent circle diameter) of 0.5 µm or more is $3 \times 10^4$ or less per mm$^2$. Such a compound distribution prevents the occurrence of microgalvanic corrosion between the compound particles and the matrix, thereby improving the corrosion resistance. Moreover, workability is improved due to increased elongation. The distribution of compounds with a particle diameter of 0.5 µm or more is still more preferably $1 \times 10^4$ or less per mm$^2$.

The aluminum alloy piping material of the present invention is refined into an O material having a tensile strength of 70–130 MPa, which is a strength suitable as an automotive piping material. Moreover, the aluminum alloy piping material is provided with improved elongation and workability, thereby enabling easy bulge formation at the pipe ends.

(3) Effects of Production Steps and Reasons for Limitations

The aluminum alloy piping material of the present invention is produced as follows. A billet of the aluminum alloy having the above composition is cast by continuous casting at a cooling rate of preferably 10° C./sec. or more. The billet is hot extruded after homogenization or without performing homogenization to prepare an aluminum alloy extruded pipe. The resulting extruded pipe is cold drawn at a working ratio ({(cross section before working–cross section after working)/(cross section before working)}×100%) of 30% or more, and then annealed. The aluminum alloy is refined into an O material by this step to obtain an aluminum alloy piping material having a tensile strength of 70–130 MPa. If the drawing working ratio is less than 30%, the grain size after annealing is increased, whereby surface roughening or cracks tend to occur during bending or bulge formation.

EXAMPLES

The present invention is described below by examples and comparative examples to demonstrate the effects of the present invention. These examples illustrate only one of the embodiments of the present invention, which should not be construed as limiting the present invention.

Example 1

Billets (diameter: 90 mm) of aluminum alloys (alloys A—O) having a composition shown in Table 1 were cast by continuous casting. The casting temperature was 700–740° C. and the cooling rate was 10° C./sec. or 20° C./sec. as shown in Table 2.

The resulting billets were homogenized at a temperature of 600° C. or more and hot extruded to form extruded pipes with an outer diameter of 25 mm and an inner diameter of 20 mm. The extruded pipes were cold drawn into the dimensions shown in Table 2, and then annealed at a temperature of 500° C. for one hour to obtain test materials. The drawing working ratio is shown in Table 2.

The resulting test materials were subjected to a tensile test to measure the tensile strength and elongation. The average grain diameter at the outer surface of the test materials was measured. A test material of which the average grain diameter of less than 200 µm was judged as "Good". The diameter and the number of compound particles in the matrix, bulge formation capability, and corrosion resistance were evaluated according to the following methods. The measurement and evaluation results are shown in Table 3.

Measurement of Diameter and Number of Compounds:

The total number of compounds with a particle diameter (equivalent circle diameter) of 0.5 µm or more within five fields of optical microstructure images (magnification: ×800, total area: 0.2 mm$^2$) was measured using an image analyzer.

Bulge Formation Capability:

After forming bulges in the test materials, the presence or absence of surface roughening was observed. In the case where no surface roughening was observed, bulge formation capability of the test material was judged as "Good". In the case where surface roughening was observed, bulge formation capability of the test material was judged "Bad".

Corrosion Resistance:

The outer surface of the test material was subjected to a repeated salt spray-humidity test (SWAAT: ASTMG85-A3) for six weeks. The maximum depth of pitting corrosion occurring at the outer surface of the test material was measured. A test material with a maximum corrosion depth of less than 0.8 mm was judged as having good corrosion resistance.

TABLE 1

| Alloy | Composition (mass %) | | | | | |
|---|---|---|---|---|---|---|
| | Si | Fe | Mn | Cu | Mg | Zr |
| A | 0.10 | 0.10 | 0.80 | 0.01 | 0.00 | — |
| B | 0.05 | 0.10 | 1.00 | 0.00 | 0.00 | — |
| C | 0.05 | 0.10 | 0.30 | 0.00 | 0.00 | — |
| D | 0.05 | 0.10 | 1.50 | 0.01 | 0.00 | — |
| E | 0.05 | 0.10 | 1.00 | 0.05 | 0.00 | — |
| F | 0.05 | 0.02 | 1.00 | 0.01 | 0.00 | — |
| G | 0.05 | 0.18 | 1.00 | 0.01 | 0.00 | — |
| H | 0.02 | 0.10 | 1.00 | 0.01 | 0.00 | — |
| I | 0.18 | 0.10 | 1.00 | 0.01 | 0.00 | — |
| J | 0.05 | 0.10 | 1.00 | 0.01 | 0.38 | — |
| K | 0.05 | 0.10 | 1.00 | 0.02 | 0.00 | — |
| L | 0.05 | 0.10 | 1.00 | 0.01 | 0.19 | — |
| M | 0.05 | 0.10 | 1.00 | 0.01 | 0.00 | 0.03 |
| N | 0.05 | 0.10 | 1.00 | 0.01 | 0.00 | 0.18 |
| O | 0.05 | 0.10 | 1.00 | 0.01 | 0.00 | — |

TABLE 2

| Test Material | Alloy | Extrusion dimension (outer diameter × inner diameter (mm)) | Drawing dimension (outer diameter × inner diameter (mm)) | Drawing working ratio (%) | Casting cooling rate (° C./s) |
|---|---|---|---|---|---|
| 1 | A | 25 × 20 | 17 × 15 | 71.6 | 10 |
| 2 | B | 25 × 20 | 17 × 15 | 71.6 | 10 |
| 3 | C | 25 × 20 | 17 × 15 | 71.6 | 10 |
| 4 | D | 25 × 20 | 17 × 15 | 71.6 | 10 |
| 5 | E | 25 × 20 | 17 × 15 | 71.6 | 10 |
| 6 | F | 25 × 20 | 17 × 15 | 71.6 | 10 |
| 7 | G | 25 × 20 | 17 × 15 | 71.6 | 10 |
| 8 | H | 25 × 20 | 17 × 15 | 71.6 | 10 |
| 9 | I | 25 × 20 | 17 × 15 | 71.6 | 10 |
| 10 | J | 25 × 20 | 17 × 15 | 71.6 | 10 |
| 11 | K | 25 × 20 | 17 × 15 | 71.6 | 10 |
| 12 | L | 25 × 20 | 17 × 15 | 71.6 | 10 |
| 13 | M | 25 × 20 | 17 × 15 | 71.6 | 10 |
| 14 | N | 25 × 20 | 17 × 15 | 71.6 | 10 |
| 15 | O | 25 × 20 | 20 × 16 | 36 | 10 |
| 16 | O | 25 × 20 | 8 × 6 | 87.6 | 10 |
| 17 | O | 25 × 20 | 17 × 15 | 71.6 | 20 |

TABLE 3

| Test Material | Alloy | Tensile strength (MPa) | Elongation (%) | Average crystal particle size ($\mu$m) | Number of compounds with particle diameter of 0.5 $\mu$m or more (per mm$^2$) | Bulge formation capability | Corrosion resistance (maximum corrosion depth) (mm) |
|---|---|---|---|---|---|---|---|
| 1 | A | 100 | 40 | 80 | 13000 | Good | 0.42 |
| 2 | B | 105 | 40 | 80 | 10000 | Good | 0.33 |
| 3 | C | 78 | 48 | 80 | 9000 | Good | 0.30 |
| 4 | D | 115 | 38 | 80 | 20000 | Good | 0.40 |
| 5 | E | 107 | 40 | 80 | 9000 | Good | 0.69 |
| 6 | F | 95 | 42 | 130 | 6000 | Good | 0.35 |
| 7 | G | 105 | 40 | 60 | 23000 | Good | 0.65 |
| 8 | H | 95 | 42 | 85 | 9000 | Good | 0.34 |
| 9 | I | 105 | 40 | 75 | 18000 | Good | 0.51 |
| 10 | J | 125 | 40 | 80 | 10000 | Good | 0.38 |
| 11 | K | 100 | 40 | 75 | 10000 | Good | 0.49 |
| 12 | L | 113 | 41 | 80 | 10000 | Good | 0.40 |
| 13 | M | 100 | 40 | 90 | 10000 | Good | 0.40 |
| 14 | N | 105 | 40 | 100 | 12000 | Good | 0.53 |
| 15 | O | 105 | 40 | 90 | 10000 | Good | 0.39 |
| 16 | O | 105 | 40 | 80 | 11000 | Good | 0.42 |
| 17 | O | 95 | 42 | 90 | 8000 | Good | 0.30 |

As shown in Table 3, the test materials according to the present invention showed a tensile strength of 70–130 MPa and produced no surface roughening during bulge formation or bending due to the grain size of less than 200 $\mu$m. The number of compounds with a particle diameter of 0.5 $\mu$m or more distributed in the matrix was 30,000/mm$^2$. These test materials exhibited good corrosion resistance with a maximum corrosion depth of less than 0.8 mm. It was confirmed that no cracks or surface roughening occurs during bulge formation or bending of the piping material for automobiles if the grain size is less than 200 $\mu$m. It was also confirmed that a piping material with a maximum corrosion depth of less than 0.8 mm does not cause problems in corrosion resistance to occur when used as a piping material for automobiles.

Comparative Example 1

Billets (diameter: 90 mm) of aluminum alloys (alloys a-k) having a composition shown in Table 4 were cast by continuous casting. The casting temperature was 700–740° C. and the cooling rate was 10° C./sec. or 0.5° C./sec. as shown in Table 5.

The resulting billets were homogenized at a temperature of 600° C. or more in the same manner as in Example 1 and hot extruded to form extruded pipes with a diameter shown in Table 5. The extruded pipes were cold drawn into an outer diameter of 17 mm and an inner diameter of 15 mm, and then annealed at a temperature of 500° C. for one hour to obtain test materials. The drawing working ratio is shown in Table 5.

The resulting test materials were subjected to a tensile test in the same manner as in Example 1 to measure the tensile strength and elongation. The average grain diameter at the outer surface of the test materials was measured. A test material of which the average grain diameter is less than 200 $\mu$m was judged as "Good". The diameter and the number of compound particles in the matrix, bulge formation capability, and corrosion resistance were evaluated according to the same methods as in Example 1. The measurement and evaluation results are shown in Table 6.

TABLE 4

| Alloy | Composition (mass %) | | | | | |
|---|---|---|---|---|---|---|
| | Si | Fe | Mn | Cu | Mg | Zr |
| a | 0.05 | 0.10 | 0.20 | 0.00 | 0.00 | — |
| b | 0.05 | 0.10 | 1.60 | 0.00 | 0.00 | — |
| c | 0.05 | 0.10 | 1.00 | 0.08 | 0.00 | — |
| d | 0.05 | 0.00 | 1.00 | 0.01 | 0.00 | — |
| e | 0.05 | 0.40 | 1.00 | 0.00 | 0.00 | — |
| f | 0.00 | 0.10 | 1.00 | 0.00 | 0.00 | — |
| g | 0.40 | 0.10 | 1.00 | 0.00 | 0.00 | — |
| h | 0.05 | 0.10 | 1.00 | 0.00 | 0.60 | — |
| i | 0.05 | 0.10 | 1.00 | 0.00 | 0.00 | 0.40 |
| j | 0.25 | 0.45 | 1.20 | 0.15 | 0.00 | — |
| k | 0.05 | 0.10 | 1.00 | 0.00 | 0.00 | — |

TABLE 5

| Test Material | Alloy | Extrusion dimension (outer diameter × inner diameter (mm)) | Drawing dimension (outer diameter × inner diameter (mm)) | Drawing working ratio (%) | Casting cooling rate (° C./s) |
|---|---|---|---|---|---|
| 18 | a | 25 × 20 | 17 × 15 | 71.6 | 10 |
| 19 | b | 25 × 20 | 17 × 15 | 71.6 | 10 |
| 20 | c | 25 × 20 | 17 × 15 | 71.6 | 10 |
| 21 | d | 25 × 20 | 17 × 15 | 71.6 | 10 |
| 22 | e | 25 × 20 | 17 × 15 | 71.6 | 10 |
| 22 | f | 25 × 20 | 17 × 15 | 71.6 | 10 |
| 24 | g | 25 × 20 | 17 × 15 | 71.6 | 10 |
| 25 | h | 25 × 20 | 17 × 15 | 71.6 | 10 |
| 26 | i | 25 × 20 | 17 × 15 | 71.6 | 10 |
| 27 | j | 25 × 20 | 17 × 15 | 71.6 | 10 |
| 28 | k | 18 × 16 | 17 × 15 | 5.9 | 10 |
| 29 | k | 25 × 20 | 17 × 15 | 71.6 | 0.5 |

TABLE 6

| Test Material | Alloy | Tensile strength (MPa) | Elongation (%) | Average crystal grain size ($\mu$m) | Number of compounds with particle diameter of 0.5 $\mu$m or more (per mm$^2$) | Bulge formation capability | Corrosion resistance (maximum corrosion depth) (mm) |
|---|---|---|---|---|---|---|---|
| 18 | a | 68 | 50 | 80 | 9000 | Good | 0.33 |
| 19 | b | 120 | 35 | 80 | 33000 | Good | 0.90 |
| 20 | c | 110 | 38 | 80 | 10000 | Good | Perforation |
| 21 | d | 90 | 42 | 300 | 5000 | Bad | 0.33 |
| 22 | e | 105 | 40 | 50 | 40000 | Good | 0.93 |
| 23 | f | 90 | 45 | 230 | 7000 | Bad | 0.35 |
| 24 | g | 110 | 38 | 60 | 31000 | Good | 0.86 |
| 25 | h | — | — | — | — | — | — |
| 26 | i | — | — | — | — | — | — |
| 27 | j | 115 | 35 | 50 | 40000 | Good | Perforation |
| 28 | k | 105 | 40 | 400 | 10000 | Bad | 0.30 |
| 29 | k | 110 | 38 | 60 | 60000 | Good | Perforation |

As shown in Table 6, test material No. 18 exhibited insufficient strength due to a low Mn content. Test material No. 19 exhibited inferior corrosion resistance since a large number of Mn compounds was formed due to a high Mn content. Test material No. 20 exhibited inferior corrosion resistance due to a high Cu content of more than 0.05%, in which perforation (maximum corrosion depth>0.1 mm) occurred. In test material No. 21, the average grain diameter was increased due to a low Fe content, thereby resulting in inferior bulge formation capability. In test material No. 22, a large number of Fe compounds was formed due to high Fe content, thereby resulting in inferior corrosion resistance. In test material No. 23, the average grain diameter was increased due to low Si content, thereby resulting in inferior bulge formation capability. In test material No. 24, a large number of Al—Mn—Si compounds and Al—Mn—Fe—Si compounds was formed due to a high Si content, thereby resulting in inferior corrosion resistance. Test materials Nos. 25 and 26 exhibited insufficient extrusion capability due to a high Mg content and a high Zr content, respectively, whereby a sound test material could not be obtained.

Test material No. 27 consisting of a conventional 3003 alloy exhibited inferior corrosion resistance due to a large number of compound particles present therein, in which perforation occurred. Test material No. 28 exhibited inferior bulge formation capability because the average grain diameter was increased after annealing due to a small drawing working ratio. Test material No. 29 exhibited inferior corrosion resistance because of a large number of compound particles present therein due to a low cooling rate during casting, in which perforation were formed.

As described above, the present invention provides an aluminum alloy piping material for automotive piping made of an Al—Mn alloy single pipe which excels in corrosion resistance and workability and is produced at a low cost. This piping material is suitably used as a piping material connecting automotive radiators and heaters or as a piping material connecting evaporators, condensers, and compressors.

Obviously, numerous modifications and variations of the present invention are possible in light of the above teachings. It is therefore to be understood that, within the scope of the appended claims, the invention may be practiced other than as specifically described herein.

What is claimed is:

1. An aluminum alloy piping material for automotive piping having excellent corrosion resistance and workability, said aluminum alloy piping material comprising an aluminum alloy consisting of, in mass %, 0.3–1.5% of Mn, 0.01–0.20% of Fe, 0.01–0.20% of Si, 0.4% or less of Mg and the balance being Al and impurities, the content of Cu as an impurity being 0.05% or less, wherein among Si compounds, Fe compounds and Mn compounds present in the alloy's matrix, the number of compounds with an equivalent circle particle diameter of 0.5 μm or more is no more than $3 \times 10^4$ per mm².

2. The aluminum alloy piping material for automotive piping of claim 1, wherein the aluminum alloy piping material refined into an O material has a tensile strength of 70–130 MPa.

3. The aluminum alloy piping material for automotive piping of claim 1, wherein the Fe content is 0.01–0.10%.

4. The aluminum alloy piping material for automotive piping of claim 1, wherein the Si content is 0.01–0.10%.

5. The aluminum alloy piping material for automotive piping of claim 1, wherein the Mg content is 0.2% or less.

6. The aluminum alloy piping material for automotive piping of claim 1, wherein the Cu content is 0.02% or less.

7. The aluminum alloy piping material for automotive piping of claim 1, wherein the number of compounds with an equivalent circle particle diameter of 0.5 μm or more is no more than $1 \times 10^4$ per mm².

8. The aluminum alloy piping material for automotive piping of claim 1, wherein the aluminum alloy contains from $6 \times 10^3$–$3 \times 10^4$ compounds with an equivalent circle particle diameter of 0.5 μm or more.

9. An aluminum alloy piping material for automotive piping having excellent corrosion resistance and workability, said aluminum alloy piping material comprising an aluminum alloy consisting of, in mass %, 0.3–1.5% of Mn, 0.01–0.20% of Fe, 0.01–0.20% of Si, 0.4% or less of Mg, 0.01–0.2% of Zr and the balance being Al and impurities, the content of Cu as an impurity being 0.05% or less, wherein among Si compounds, Fe compounds and Mn compounds present in the alloy's matrix, the number of compounds with an equivalent circle particle diameter of 0.5 μm or more is no more than $3 \times 10^4$ per mm².

10. The aluminum alloy piping material for automotive piping of claim 9, wherein the aluminum alloy piping material refined into an O material has a tensile strength of 70–130 MPa.

11. The aluminum alloy piping material for automotive piping of claim 9, wherein the Fe content is 0.01–0.10%.

12. The aluminum alloy piping material for automotive piping of claim 9, wherein the Si content is 0.01–0.10%.

13. The aluminum alloy piping material for automotive piping of claim 9, wherein the Mg content is 0.2% or less.

14. The aluminum alloy piping material for automotive piping of claim 9, wherein the Cu content is 0.02% or less.

15. The aluminum alloy piping material for automotive piping of claim 9, wherein the number of compounds with an equivalent circle particle diameter of 0.5 μm or more is no more than $1 \times 10^4$ per mm².

16. The aluminum alloy piping material for automotive piping of claim 9, wherein the aluminum alloy contains from $6 \times 10^3$–$3 \times 10^4$ compounds with an equivalent circle particle diameter of 0.5 μm or more.

17. An aluminum alloy piping material for automotive piping having excellent corrosion resistance and workability, said aluminum alloy piping material comprising an aluminum alloy consisting of, in mass %, 0.3–1.5% of Mn, 0.01–0.20% of Fe, 0.01–0.20% of Si, 0.4% or less of Mg and the balance being Al and impurities, the content of Cu as an impurity being 0.05% or less, wherein among Si compounds, Fe compounds and Mn compounds present in the alloy's matrix, compounds with an equivalent circle particle diameter of 0.5 μm or more are present in an amount not exceeding $3 \times 10^4$ per mm².

18. An aluminum alloy piping material for automotive piping having excellent corrosion resistance and workability, said aluminum alloy piping material comprising an aluminum alloy consisting of, in mass %, 0.3–1.5% of Mn, 0.01–0.20% of Fe, 0.01–0.20% of Si, 0.4% or less of Mg, 0.01–0.2% of Zr and the balance being Al and impurities, the content of Cu as an impurity being 0.05% or less, wherein among Si compounds, Fe compounds and Mn compounds present in the alloy's matrix, compounds with an equivalent circle particle diameter of 0.5 μm or more are present in an amount not exceeding $3 \times 10^4$ per mm².

* * * * *